United States Patent

Tsunemi

[11] Patent Number: 5,928,099
[45] Date of Patent: Jul. 27, 1999

[54] CRAWLER DRIVE UNIT

[75] Inventor: Masahiro Tsunemi, Miki, Japan

[73] Assignee: NABCO Ltd., Kobe, Japan

[21] Appl. No.: 08/773,710

[22] Filed: Dec. 24, 1996

[30] Foreign Application Priority Data

Dec. 27, 1995 [JP] Japan ..................................... 7-352723
Nov. 8, 1996 [JP] Japan ..................................... 8-312731

[51] Int. Cl.⁶ .............................. F16H 1/46; F16H 57/02
[52] U.S. Cl. .......................... 475/83; 475/331; 180/9.62; 411/517
[58] Field of Search ............................... 475/83, 72, 331, 475/337; 180/9.62; 411/517–519, 353, 521; 384/903, 537, 626; 403/355, 356, 375; 192/91 A, 85 AA; 188/170, 71.5

[56] References Cited

U.S. PATENT DOCUMENTS

| | | | |
|---|---|---|---|
| 2,273,772 | 4/1942 | Pollitz | 411/519 |
| 3,203,268 | 8/1965 | Manoni et al. | 411/519 |
| 4,029,166 | 6/1977 | Haak et al. | 475/83 X |
| 4,271,725 | 6/1981 | Takao et al. | 475/331 X |
| 4,275,616 | 6/1981 | Ehrlinger et al. | 475/83 |
| 4,380,274 | 4/1983 | Abraham et al. | 475/83 X |
| 4,408,746 | 10/1983 | Marsch et al. | 475/83 X |
| 4,583,425 | 4/1986 | Mann et al. | 475/83 |
| 4,722,240 | 2/1988 | Fredrick et al. | 384/903 X |
| 5,076,401 | 12/1991 | Ta et al. | 188/170 X |
| 5,107,718 | 4/1992 | Inagawa | 475/83 X |

FOREIGN PATENT DOCUMENTS 4-1710 of 0000 Japan .
48603 3/1986 Japan ....................................... 475/83
49205 5/1992 Japan ..................................... 475/337

OTHER PUBLICATIONS

Deutschman et al., Machine Design, p. 222, 1975.

*Primary Examiner*—John A. Jeffery
*Assistant Examiner*—William C Joyce
*Attorney, Agent, or Firm*—Oblon, Spivak McClelland, Maier & Neustadt, P.C.

[57] ABSTRACT

A crawler drive unit for propelling a construction machine such as a shovel-type excavator having a pair of crawler track assemblies comprises a hydraulic motor (11) and a speed reducer (12), the latter including a stationary carrier (29) having carrier pins journaled therein, carrier gears (28) keyed to the carrier pins respectively, a first disk-type portion (40), and a second disktype portion (46) radially inwardly projecting from the first disk-type portion (40). An end face of the casing (13) of the hydraulic motor (11) is substantially coplanar with a surface of the stationary carrier (29) in which the annularly hollowed-out portion (47) is provided and another surface of the stationary carrier (29) which allows one end face of each carrier pin to abut thereagainst. With this arrangement, the stationary carrier (29) can be disposed in close proximity to the end portion (35) of the casing (13). This allows a compact arrangement requiring less dimension in the axial direction of the speed reducer (12) to be obtained. The casing (13) is allowed to have a thin wall, because it is free from excessive stresses which are commonly caused by the load set up in the sprocket wheel when a prior art unit is started.

11 Claims, 6 Drawing Sheets

CRAWLER DRIVE UNIT

FIELD OF THE INVENTION

This invention relates to a propelling means which is widely used in the field of construction machines, and more particularly to a propelling means which is utilized for propelling a construction machine such as a shovel-type excavator having a pair of crawler track assemblies.

BACKGROUND OF THE INVENTION

Heretofore, a shovel-type excavator 150 (FIG. 5) is provided with a propelling mechanism 153 having a pair of caterpillar tracks 152 driven by a propelling means 151. A rotatable base assembly 155 mounted on the propelling mechanism 153 affords support for an articulated bucket arm 154 which may be inclined at any desired angle by a hydraulic cylinder, operator's cab, engine for providing operating power to a hydraulic pump which supplies hydraulic fluid under pressure to the hydraulic cylinder, and bulldozer.

In order to do the excavation work and the work of loading the earth into transport vehicles by means of this prior art shovel-type excavator 150, the ingress and egress of hydraulic fluid from hydraulic cylinders allotted respectively for the propelling mechanism 153 and the articulated bucket arm 154 are effected from a control panel provided in the operator's cab.

Various types of propelling means 151 for the propelling mechanism 153 are known, including the one disclosed in Japanese Laid Open Utility Model Application No. 4-1710. FIG. 6 is a view of a propelling means 151 in accordance with the prior art.

The propelling means 151 shown in FIG. 6 includes a hydraulic motor 160 and a speed reducer 161. The latter takes the form of a planetary gear set, in which the outer portions of planetary gears are in mesh engagement with an internal ring gear 166. The internal ring gear 166 constitutes the output side of the speed reducer 161 and is rotatably mounted on the casing 164 of the hydraulic motor 160. The caterpillar track 152 cooperates with a sprocket wheel 156 fixed on the internal ring gear 166.

The rotation of the output shaft 162 of the hydraulic motor 160 will effect a rotation of a second sun gear 168 through a first sun gear 163 and the planetary gears 167. A carrier 165 secured to the hydraulic motor 160 rotatably carries carrier gears 169, through which the rotating second sun gear 168 will effect a rotation of the internal ring gear 166, which in turn will drive the caterpillar track through the sprocket wheel 156.

The output shaft 162 of the hydraulic motor 160 is rotatably supported by the casing 164 and carries a cylinder block 170 having a plurality of pressure chambers, in each of which an axially movable piston 171 is slidably mounted. The end of the piston 171 is adapted to engage a bearing plate 172 seated on the casing 164 at an oblique angle to the axis thereof. When a pressure chamber having an opening disposed in the immediate vicinity of the bearing plate 172 is replenished with hydraulic oil, the piston 171 accommodated therein is shifted toward extend position. Consequently, the end of this piston 171 bears upon the bearing plate 172 and causes the output shaft 162 to rotate.

A spring brake 180 interposed between the casing 164 and the cylinder block 170 includes a spring 174. When the hydraulic oil is displaced from the hydraulic motor 160, the cylinder block 170 which has been rotating is yieldingly biased by the spring 174 to a standstill. A counterbalance valve 173 serves to keep the pressure applied to the ingressive hydraulic oil higher than the pressure applied to the egressing hydraulic oil.

It is a matter of course that the propelling mechanism of a construction machine should not have a portion disposed sideways away from the outer edge of the caterpillar track. If the propelling mechanism has such a portion, it may well be that this portion will strike against an obstacle such as stones, tiles, pebbles or scrap wood and will be damaged thereby.

There is no teaching in the prior art that a compact arrangement requiring less dimension in the transverse direction may be attained with respect to the components of the propelling mechanism such as the hydraulic motor and the speed reducer, without detriment to the productivity in manufacturing these components.

It,is accordingly a principal object of the present invention to provide a crawler drive unit in which a compact arrangement requiring less dimension not only in the transverse direction but also in the longitudinal direction is attained with respect to the components of the propelling mechanism.

SUMMARY OF THE INVENTION

According to one aspect of the present invention, there is provided a crawler drive unit comprising a hydraulic motor and a speed reducer. The speed reducer includes a stationary carrier having carrier pins journaled therein and carrier gears keyed to the carrier pins respectively. The stationary carrier is provided with an annularly hollowed-out portion in such a position as to conform to one end face of the casing of the hydraulic motor. This end face of the casing of the hydraulic motor is substantially coplanar with a surface of the stationary carrier in which the annularly hollowed-out portion is provided and another surface of the stationary carrier which allows one end face of each carrier pin to abut thereagainst.

It will be seen that, with this arrangement, the stationary carrier can be disposed in close proximity to the end portion of the casing. This allows a compact arrangement requiring less dimension in the axial direction of the speed reducer to be obtained. The casing is allowed to have a thin wall, because it is free from excessive stresses which are commonly caused by the load set up in the sprocket wheel when a prior art unit of the kind indicated above is started.

According to another aspect of the invention, there is also provided a crawler drive unit comprising a hydraulic motor and a speed reducer. The speed reducer includes a thrust plate which is positioned in, and is substantially as thick as the depth of, a seat formed in the annular wall of a rotating carrier.

This construction also allows a compact arrangement requiring less dimension in the axial direction of the speed reducer to be obtained. The axial outward movement of a first sun gear accommodated in the rotating carrier is limited by the thrust plate.

The thrust plate is provided with a detent fitting into a keeper socket provided in the inner cylindrical surface of the aforesaid seat. At least a portion of the thrust plate, against which one end of a shaft carrying the first sun gear is allowed.to abut, is hardened.

Because of the detent fitting into the keeper socket, the thrust plate is prevented from rotating relative to the rotating carrier. The hardened portion of the thrust plate is free from getting worn and producing metal particles incidental to wear.

A sleeve overlies both the shaft carrying the first sun gear and the output shaft of the hydraulic motor so as to connect one to the other. A major portion of the sleeve is received in a bore provided in a second sun gear such that the second sun gear overlies the sleeve in spaced relation thereto.

The two shafts connected in this manner obviate the necessity for a joint member which would require additional space therebetween in the axial direction thereof. An adverse effect which would be caused by the teeth of the rotating carrier engaging only a portion of the teeth on the mating second sun gear as will appear hereinafter is invalidated by the second sun gear overlying the sleeve in spaced relation thereto.

According to still another aspect of the invention, a circular flange extends from the. rotating carrier to overlie the second sun gear.

This construction also allows a compact arrangement requiring less dimension in the axial direction of the speed reducer to be obtained.

According to yet still another aspect of the invention, there is also provided a crawler drive unit comprising a hydraulic motor and a speed reducer. The speed reducer includes an internal ring gear, which is closed at its one end by an end cover. At the other end of the internal ring gear, a supporting member is held in place by other bolts than those by which the end cover is held in place.

This means that the end cover and the supporting member are not secured to the internal ring gear by means of radially outwardly projecting flanges which would require additional dimension in the radial direction of the speed reducer.

The end of the supporting member abutting against the aforesaid other end of the internal ring gear is substantially as thick as the internal ring gear. The interior of the supporting member is defined by a frustoconical inner surface which converges from the aforesaid end toward a portion disposed approximately medially of the ends of the supporting member.

Such configuration is particularly suitable for employment in those cases where the crawler drive unit has to be designed to be relatively lightweight.

The supporting member is rotatably supported by a pair of ball bearing race assemblies secured between the supporting member per se and the casing of the hydraulic motor. A spacer element integrally formed with the supporting member for retaining the space between two outer races of the ball bearing race assemblies has one end face disposed in closer proximity to the speed reducer than the other end face and in slightly closer proximity to the speed reducer than one of the four end faces of the outer races which is disposed in the closest proximity to the speed reducer.

Such configuration is particularly suitable for employment in those cases where the crawler drive unit has to be designed to be relatively lightweight.

The end cover has a very short cylindrical extension formed into a cylindrical socket for receiving one end of the internal ring gear. The supporting member also has a very short cylindrical extension formed into a cylindrical socket for receiving the other end of the internal ring gear.

Since the cylindrical socket provided in the supporting member can carry the total load acting on the internal ring gear, the rim of the internal ring gear is allowed to have a thin wall requiring less dimension in the radial direction.

According to the fifth aspect of the invention, the casing of the hydraulic motor has a first portion which is of smaller diameter and carries the inner races of the ball bearing race assemblies, a second portion which is of larger diameter and is disposed away from the speed reducer, and a radial shoulder defined at the intersection of these two portions and having an annular recess provided therein. One of the inner races is allowed to abut against this radial shoulder.

The annular recess prevents a shim for positioning the ball bearing race assembly from being lifted out of place.

According to the sixth aspect of the invention, the other of the inner races is allowed to abut against a holder, which consists of a plurality of arcuate members fitting into a groove circumferentially formed in the casing of the hydraulic motor and a ring-shaped member mounted circumferentially around the arcuate members.

The arcuate members provided separately from the ring-shaped member allow much latitude in deciding on the depth of the groove.

The ring-shaped member and portions of the arcuate members disposed outwardly of the groove are secured between the end face of the aforesaid stationary carrier and the end face of the aforesaid other of the inner races.

With such an arrangement, it is impossible to allow the ring-shaped member to be unintentionally uncoupled from the arcuate members after the assembling thereof.

Means for fixedly holding the arcuate members in position may be alternatively achieved by forming an annular recess in the end face of the stationary carrier and accommodating the arcuate members therein.

Such an arrangement obviates the necessity for other means such as the aforesaid ring-shaped member for fixedly holding the arcuate members.

The groove circumferentially formed in the casing of the hydraulic motor may be replaced by a plurality of longitudinally formed grooves which are equally circumferentially spaced and each of which is of semicircular cross-section. In this case, each groove is fitted with a member which conforms to and is generally complementary to the inner semicylindrical surface of the groove and has a portion slightly protruding from the groove so as to mount the ring-shaped member thereon.

As compared with the circumferentially formed groove, these alternative grooves can be made deep enough to stabilize the holder without detriment to the strength of the casing.

According to the seventh aspect of the invention, there is also provided a crawler drive unit comprising a hydraulic motor and a speed reducer. The casing of the hydraulic motor has an axially aligned bore and counterbore therein, and a radial shoulder is defined at the intersection thereof. A pressure chamber is defined between a pair of annular seals arranged upon an axially movable piston operable in the bore and counterbore. A portion of the piston disposed inwardly of the pressure chamber is of smaller diameter than another portion of the piston operating in the bore. Such configuration requires less dimension for the hydraulic motor.

BEST MODES OF OPERATION

A preferred embodiment of the present invention is hereinafter described with reference to the accompanying drawings.

Figure 1:
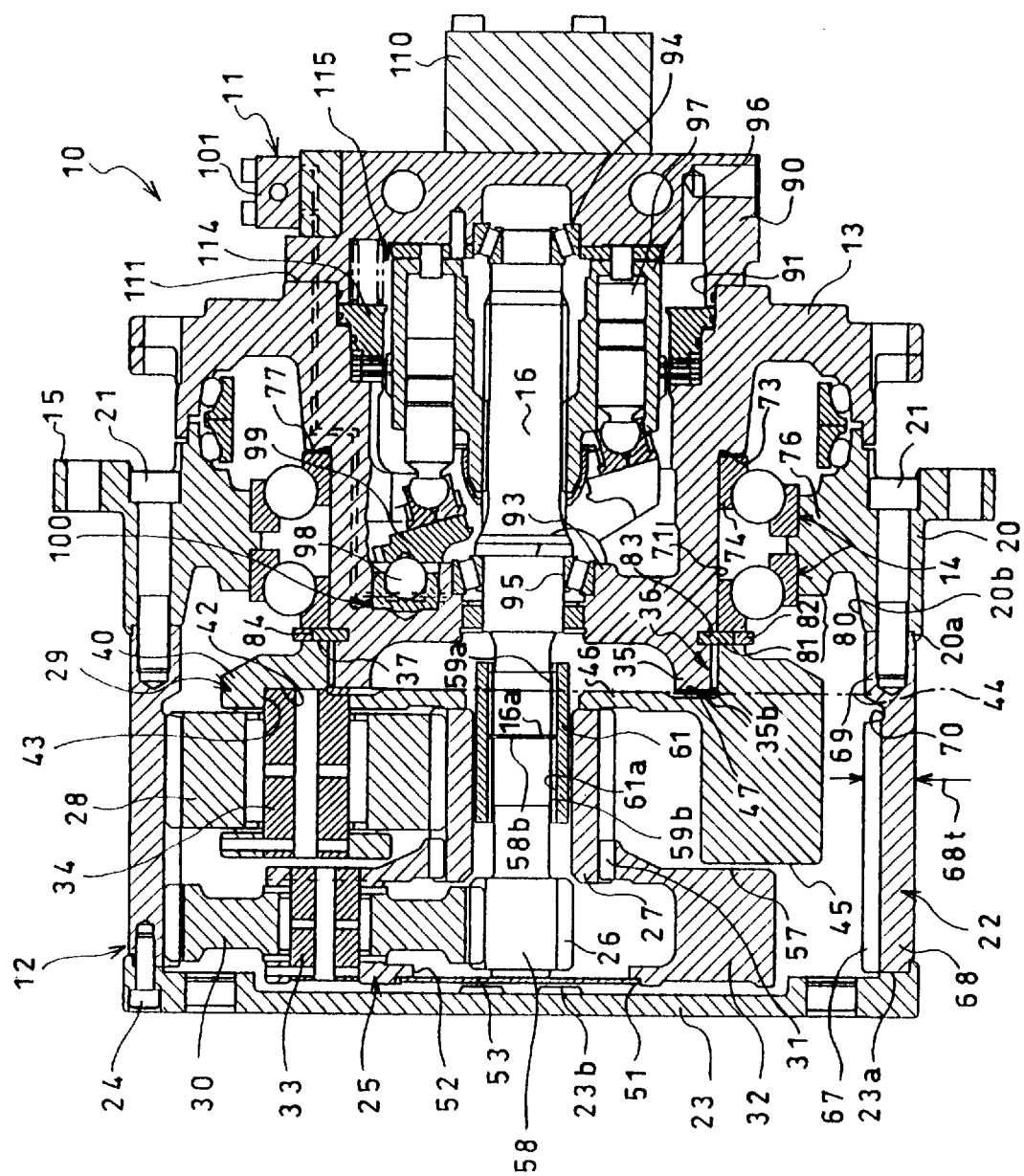
FIG. 1 is a sectional view of a crawler drive unit of this invention.
Figure 5:
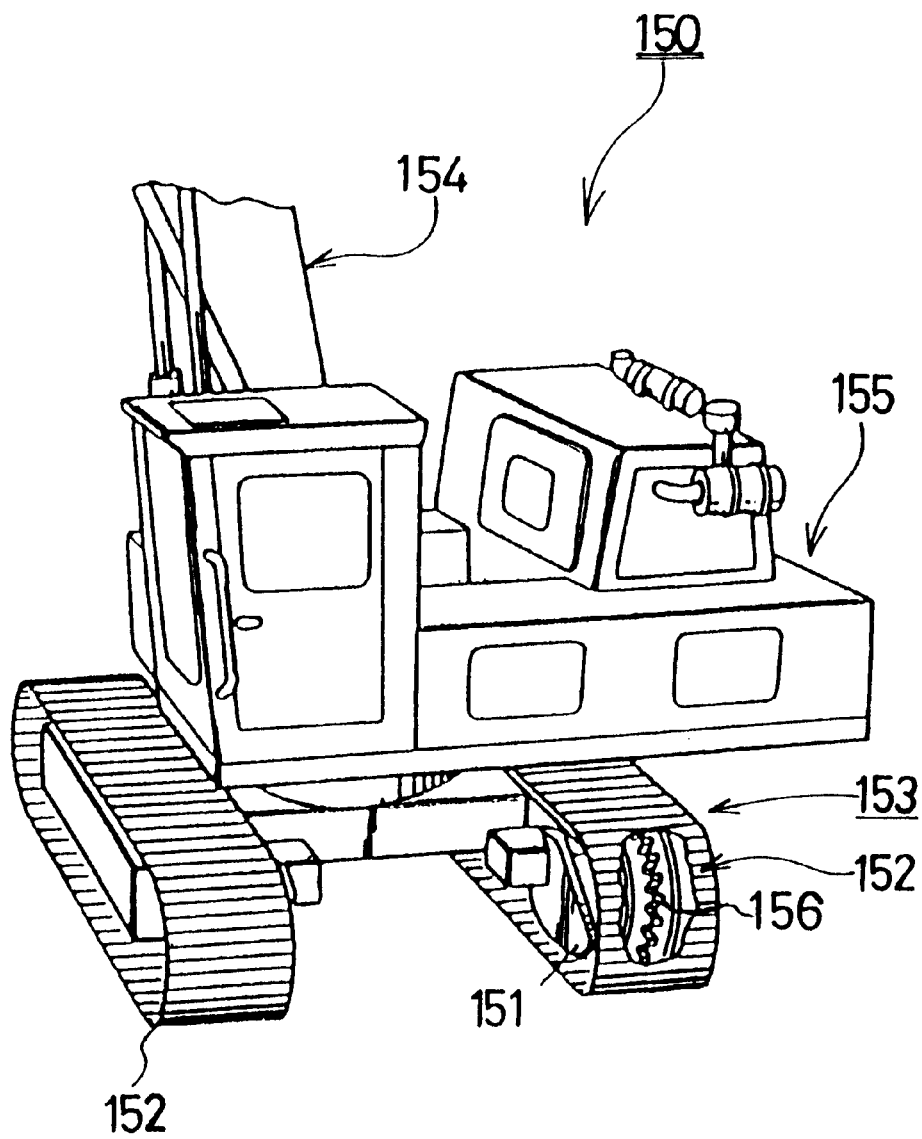
FIG. 5 is a perspective view of the entire propelling mechanism installed in a shovel-type excavator.
Figure 6:
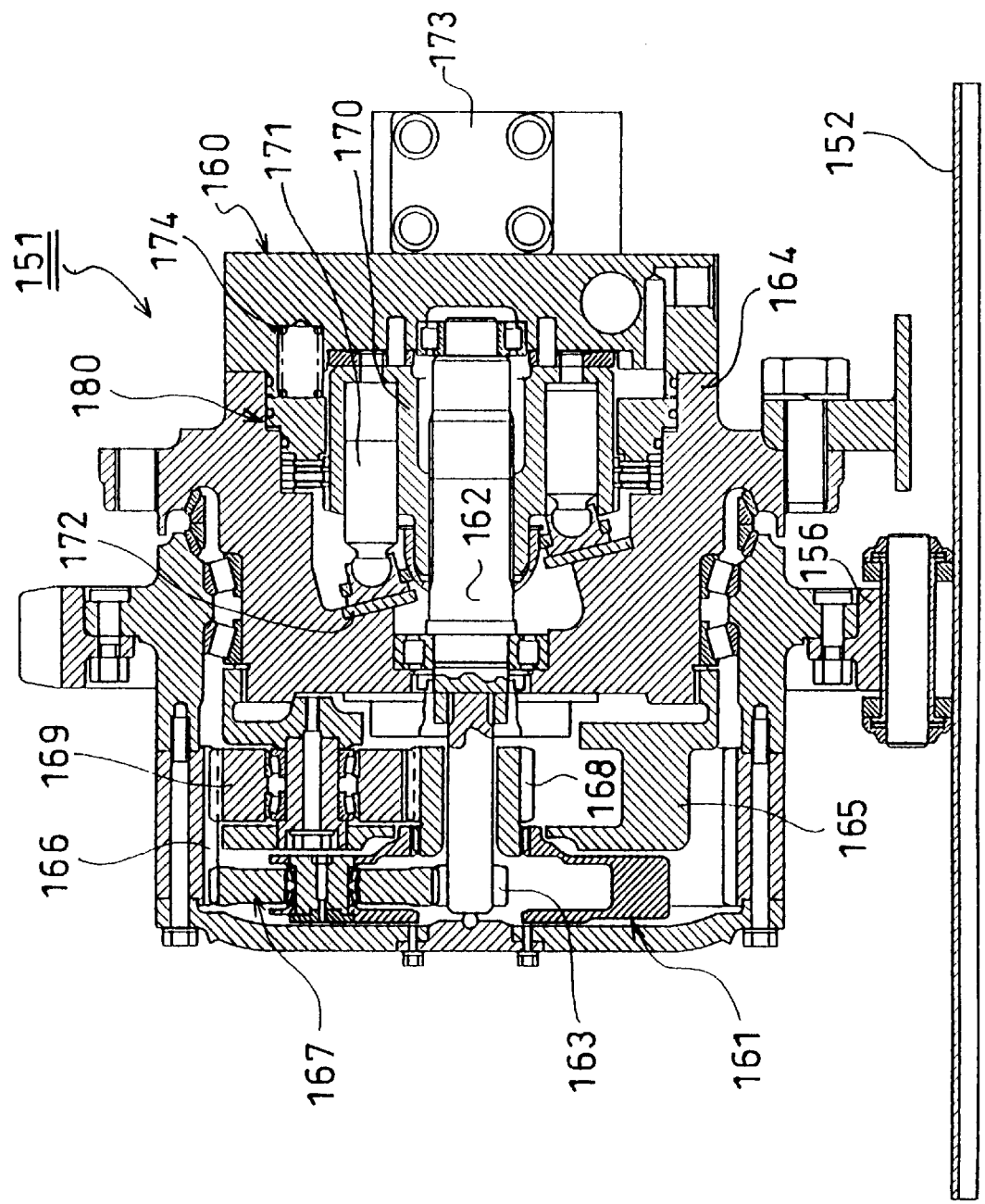
FIG. 6 is a sectional view of a prior art crawler drive unit.

A propelling mechanism 10 shown in FIG. 1 comprises a hydraulic motor 11 and a speed reducer 12 extending coaxially of the hydraulic motor 11. The speed reducer 12 is rotatably mounted on the casing 13 of the hydraulic motor 11 by means of bearings 14 but is not movable axially relative thereto. The propelling mechanism 10 is formed with a peripheral flange 15 approximately medially of the ends thereof. A sprocket wheel (corresponding to the sprocket wheel 156 in FIG. 5) is fixed on the flange 15. The hydraulic motor 11 and the speed reducer 12 connected to each other serve to minimize the axial dimension of the propelling mechanisnm 10. Because of the provision of the speed reducer 12, a small-sized hydraulic motor designed to exert a low torque while developing a large number of revolutions can be used.

The speed reducer 12 takes the form of a planetary gear set 25 designed to obtain a large reduction ratio by means of a small number of gears. The speed reducer 12 is secured to a supporting member 20 by means of a plurality of bolts 21. The supporting member 20, in turn, is rotatably supported by a pair of ball bearing race assemblies 14 secured between the supporting member 20 per se and the casing 13 of the hydraulic motor 11 but is not movable axially relative thereto. In the planetary gear set 25, the outer portions of planetary gears 30 are in mesh engagement with an internal ring gear 22, which is closed at its one end by an end cover 23. The end cover 23 is held in place by means of a plurality of bolts 24 and, together with the internal ring gear 22, defines a space for accommodating a first sun gear 26, second sun gear 27, carrier gears 28, and stationary. carrier 29 carrying the carrier gears 28.

The first sun gear 26 is in mesh engagement with the planetary gears 30 at their inner portions. A shaft 58 carrying the first sun gear 26 is connected to the output shaft 16 of the hydraulic motor 11. The planetary gear set 25 further includes a rotating carrier 32 on which are mounted pins 33 for receiving rotatably thereon the planetary gears 30. A circular flange extends from the rotating carrier 32 to overlie the second sun gear 27 and form a splined connection, as at 31, between the rotating carrier 32 and the second sun gear 27.

The planetary gear set 25 further includes a stationary carrier 29 having three carrier pins 34 journaled therein and a carrier gear 28 keyed to each of the carrier pins 34. The carrier gears 28 are in mesh engagement both with the second sun gear 27 and with the internal ring gear 22. The stationary carrier 29 is not rotatable but is movable axially relative to the output shaft 16 of the hydraulic motor 11. This is because a splined connection is formed, as at 36, between the stationary carrier 29 and the casing 13 of the hydraulic motor 11.

The rotation of the output shaft of the hydraulic motor 11 will effect a rotation of the first sun gear 26. Then the planetary gears 30 and the second sun gear 27 rotate at a speed much lower than that at which the output shaft of the hydraulic motor 11 turns. The carrier gears 28 further reduce the speed at which the power is transmitted to the internal ring gear 22 and the supporting member 20. The caterpillar tracks 152 (FIG. 5) are driven thereby.

The stationary carrier 29 has a disk-type portion 40 extending radially outwardly from an inner cylindrical surface (splined to the casing 13 at 36) toward the internal ring gear 22, curving toward the ball bearing race assemblies 14, and terminating with a narrow end face abutting against a holder for fixedly holding one of the two ball bearing race assemblies 14 in position. On the side of the disk-type portion 40 opposite the aforesaid narrow end face, the stationary carrier 29 has three blind holes 43 (of which only one is shown) formed therein for receiving the journal portions of three carrier pins 34 respectively, to each of which a carrier gear 28 is keyed.

A second disk-type portion 46 radially inwardly projects from the first mentioned disk-type portion 40 and is provided with an annularly hollowed-out portion 47 in such a position as to conform to one end face 35b of the casing 13. During the process of machining the spline 36, the annularly hollowed-out portion 47 is suitable for use as a space for allowing a tool to run off.

As indicated by a dot-dash line 44, the end face 35b of the casing 13 may be made substantially coplanar with a surface of the second disk-type portion 46 in which the annularly hollowed-out portion 47 is provided. Alternatively, the annularly hollowed-out portion 47 makes it possible to allow the end portion 35 of the casing 13 to engage therein. This allows a compact arrangement requiring less dimension in the axial direction to be obtained.

A vertical surface 42, where each of the three blind holes 43 terminates, also substantially coincides with the plane indicated by the dot-dash line 44. This construction also allows a compact arrangement requiring less dimension in the axial direction of the speed reducer 12 to be obtained.

The stationary carrier 29 having a plurality of splines 36 is keyed on the end portion 35 of the casing 13. This means that the load set up in the sprocket wheel for driving the caterpillar track 152 is applied to a portion which is of relatively larger diameter and is disposed in the vicinity of the internal ring gear 22. Therefore, narrow splines 36 will sufficiently meet the need of operation. Pressure P on the side of a spline 36 is obtained by the formula $$P = 2T/D^2 \cdot L$$

where T=torque capacity required for driving the caterpillar track 152

D=pitch diameter of the spline 36

L=length of spline bearing surface

It will be seen that, with this arrangement, the stationary carrier 29 can be disposed in close proximity to the end portion 35 of the casing 13. This allows a compact arrangement requiring less dimension in the axial direction of the speed reducer 12 to be obtained. The casing 13 is allowed to have a thin wall, because it is free from excessive stresses which are commonly caused by the load set up in the sprocket wheel when a prior art unit of the kind indicated above is started.

The rotating carrier 32, which is generally similar to the stationary carrier 29, forms a part of the planetary gear set 25 and has three equally circumferentially spaced planetary gears 30 (of which only one is shown). A circular flange extends from the rotating carrier 32 to overlie the second sun gear 27 and form a splined connection, as at 31, between the rotating carrier 32 and the second sun gear 27. From FIG. 1, it will be seen that the second sun gear 27 is coaxial with a shaft 58 in spaced relation thereto. The shaft 58 is connected to the output shaft 16 of the hydraulic motor 11.

The shaft 58 carries the first sun gear 26 in the rotating carrier 32. The planetary gears 30 are in mesh engagement both with the first sun gear 26 and with the internal ring gear 22. One end face of the rotating carrier 32 disposed in opposed relationship to the end cover 23 has an opening 52. A seat 51 is formed in the inner cylindrical surface of the opening 52 such that a thrust plate 53 which substantially as thick as the axial depth of the seat 51 is positioned therein from the outside. One end of the shaft 58 is allowed to abut against the thrust plate 53. Although the shaft 58 is free for limited movement in the radial direction, the outward movement of the shaft 58 and the first sun gear 26 from within the internal ring gear 22 is confined by the thrust plate 53.

In utilization of the above arrangement, the power transmission system such as gears is free from deformation which would otherwise be caused by the load set up in the crawler drive unit when the propelling mechanism 10 is started. This is because an adverse effect which would be caused by the teeth of the planetary gears 30 engaging only a portion of the teeth on the mating first sun gear 26 is invalidated by the shaft 58 which is free for limited movement in the radial direction.

Figure 2:
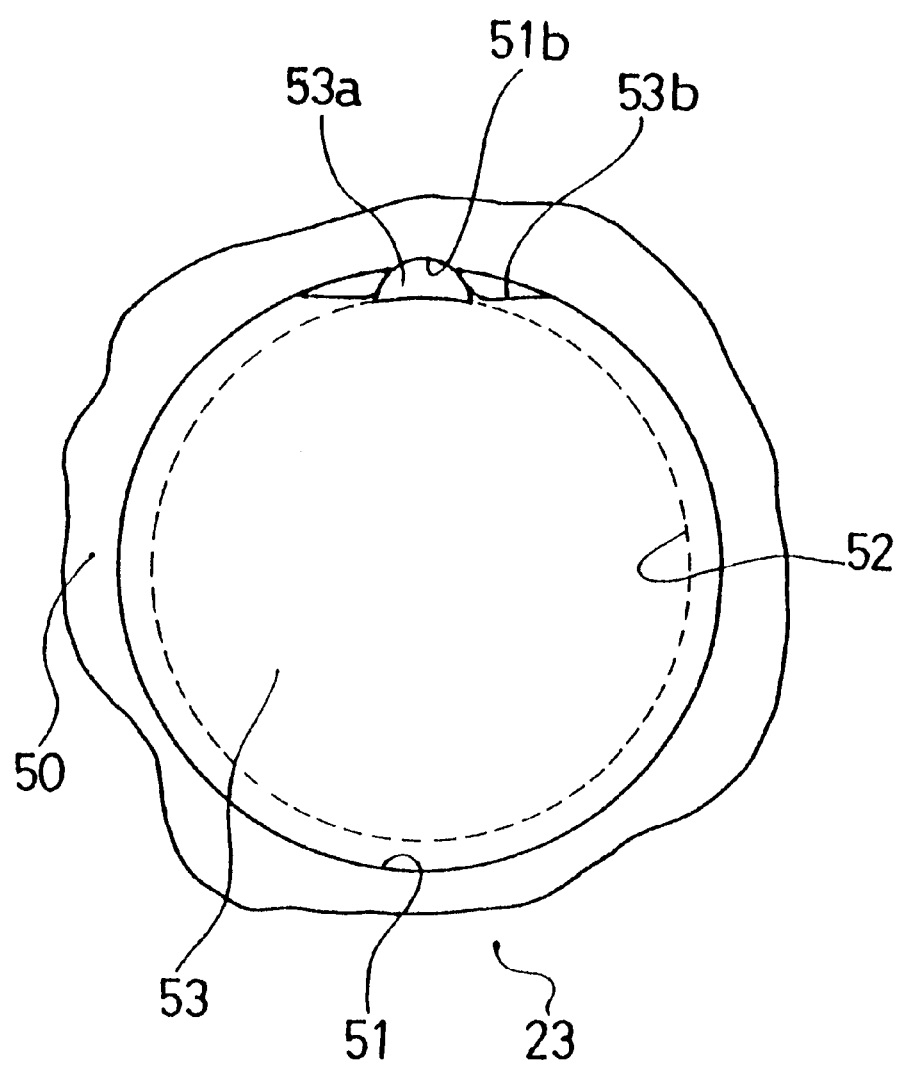
FIG. 2 is a fragmentary part sectional view thereof as seen axially from the left-hand end of FIG. 1.

Referring now to FIG. 2, the thrust plate 53 is provided with a detent 53a fitting into a keeper socket 51b provided in the inner cylindrical surface of the aforesaid seat 51. Consequently, even the frictional contact of the first sun gear 26 does not cause the thrust plate 53 to rotate. Means for preventing the thrust plate 53 from rotating relative to the rotating carrier 32 may of course be designed in various other ways than the aforesaid one. In order to manufacture the thrust plate 53, it is most common to punch a soft iron plate and harden at least a portion of the half-finished plate, against which one end of the shaft 58 is to be allowed to abut, by bright hardening or carburizing. The hardened portion of the thrust plate 53 is free from getting worn and producing metal particles incidental to wear. The end cover 23 has projections 23b on its inner surface. These projections 23b allow the thrust plate 53 to bear thereupon. Cutaway portions 53b are provided at opposite sides of the detent 53a.

The soft iron plate as a material for the thrust plate 53 is suitable for ease of manufacture. Since the thrust plate 53 is allowed to have a thin wall, a compact arrangement requiring less dimension in the axial direction of the speed reducer 12 is obtained.

The construction of the rotating carrier 32 is such that the spline bearing surface 31 extends across a plane on which an end face 45 of the stationary carrier 29 lies. This construction also allows a compact arrangement requiring less dimension in the axial direction of the speed reducer 12 to be obtained. An end face 57 of the rotating carrier 32 is disposed in the immediate vicinity of the end face 45 of the stationary carrier 29.

The first sun gear 26 is either rigidly mounted on the shaft 58 in any known manner or integrally formed therewith. One end 58b of the shaft 58 and one end 16a of the output shaft 16 of the hydraulic motor 11 are of equal diameter and abut against each other. Splines 59a terminating at the end 16a are formed in the cylindrical surface of the end portion of the output shaft 16. Splines 59b terminating at the end 58b are formed in the cylindrical surface of the end portion of the shaft 58. The shape of the splines 59b is the same as that of the splines 59a. A sleeve 61 provided with mating splines 61a overlies both the shaft 58 and the output shaft 16 so as to form a splined connection together with the splines 59a and 59b. Although a portion of the sleeve 61 extends across the plane indicated by the dot-dash line 44, a major portion of the sleeve 61 is received in a bore provided in the second sun gear 27 such that the second sun gear 27 overlies the sleeve 61 in spaced relation thereto. Consequently, at the time of starting the propelling mechanism 10, an adverse effect which would be caused by the teeth of the rotating carrier 32 engaging only a portion of the teeth on the mating second sun gear 27 is invalidated by the shaft 58 which is free for limited movement in the radial direction. The shaft 58 and the output shaft 16 connected in this manner obviate the necessity for a joint member which would require additional space therebetween in the axial direction thereof.

As shown in FIG. 1, the internal ring gear 22 having a rim 68 integrally formed with teeth 67 is closed at its one end by an end cover 23, which is held in place by means of a plurality of bolts 24. At the other end, the internal ring gear 22 is provided with a portion 69 tapped to engage a plurality of bolts 21 by which the supporting member 20 is held in place. The portion 69 is substantially as thick as 68t, which is the sum of the depth of the teeth 67 and the thickness of the rim 68. An annular groove 70 is interposed between the teeth 67 and the portion 69. The end cover 23 has a very short cylindrical extension formed into a cylindrical socket for receiving one end 23a of the internal ring gear 22. The supporting member 20 also has a very short cylindrical extension formed into a cylindrical socket for receiving the other end 20a of the internal ring gear 22.

Thus an important feature of the invention is that the rim 68 and the portion 69 are of equal outer diameter and, therefore, the bolts 21 and 24 do not require additional dimension in the radial direction of the internal ring gear 22. Since the portion 69 is substantially as thick as the toothed portion of the internal ring gear 22, the internal ring gear 22 can be forged by a through process from a hollow cylinder having an even thickness. The supporting member 20 and the end cover 23 having very short cylindrical extensions formed into cylindrical sockets for receiving the ends 20a and 23a respectively of the internal ring gear 22 prevent the internal ring gear 22 from being deformed and permit the same to have a thin wall and hence less dimension in the radial direction.

The supporting member 20 is rotatably supported by a pair of ball bearing race assemblies 14 secured between the supporting member 20 per se and the casing 13 of the hydraulic motor 11. The casing 13 of the hydraulic motor 11 has a first portion 71 which is of smaller diameter and carries the inner races 74 of the ball bearing race assemblies 14, a second portion which is of larger diameter and is disposed away from the speed reducer 12, and a radial shoulder 73 defined at the intersection of these two portions and allowing one of the inner races 74 to abut thereagainst. In order to retain the space between two outer races, a spacer element 76 is integrally formed with the supporting member 20.

The end of the supporting member 20 abutting against the aforesaid other end 20a of the internal ring gear 22 is substantially as thick as the internal ring gear 22. The interior of the supporting member 20 is defined by a frustoconical inner surface 20b which converges from the aforesaid end toward a portion disposed approximately medially of the ends of the supporting member 20. The spacer element 76 has one end face disposed in closer proximity to the speed reducer 12 than the other end face and in slightly closer proximity to the speed reducer 12 than one of the four end faces of the outer races which is disposed in the closest proximity to the speed reducer 12. The two ball bearing race assemblies 14 exert force on the supporting member 20 along two lines of action respectively. Since the intersection of the two lines of action falls in the spacer element 76, it is not necessary for the supporting member 20 to have a thick wall in the portion other than the spacer element 76. Thus the provision of the frustoconical inner surface 20b is justified from the standpoint of providing a structure of light weighs. A radial reaction line L forms an axial component of one of the lines of action such that a top face 14b of an inner rib 14a of supporting member 20 is positioned slightly over the reaction line L.

For the purpose of stress relief, an annular recess 77 which is of curved cross-section is provided in a portion of the radial shoulder 73 adjacent the first portion 71 of the casing 13. As aforesaid, one of the inner races 74 is allowed to abut against the radial shoulder 73. The other of the inner races 74 is allowed to abut against a holder 80 fitting into a groove circumferentially formed in the first portion 71 adjacent the splines 36.

The invention contemplates an arrangement in which the peripheral center of the sprocket wheel 156 coincides with a plane equidistant from the two ball bearing race assemblies 14. The term "peripheral center of the sprocket wheel 156" as used herein is defined as a plane normal to a line passing through the rotating axis of the sprocket wheel 156 and passing between major surfaces of the sprocket wheel 156 to intersect the apices of the teeth of the sprocket wheel 156. There are some cases where, for the purpose of aligning the ball bearing race assembly 14, a shim is secured between the radial shoulder 73 and one of the inner races 74 allowed to abut thereagainst.

The annular recess 77 provided in a portion of the radial shoulder 73 adjacent the first portion 71 of the casing 13 permits the shim to properly engage the radial shoulder 73. In current practice, an ordinary process of machining the radial shoulder 73 usually results in the formation of a round fillet between the first portion 71 and the radial shoulder 73. The shim runs on this round fillet and is prevented from properly engaging the radial shoulder 73. The annular recess 77, which is advantageously configured to get rid of the round fillet, permits the shim to properly engage the radial shoulder 73 and thereby permits the ball bearing race assembly 14 to be properly positioned.

The aforesaid holder 80 includes two semicircular members 81 made by dividing a ring-shaped member into two equal parts. The holder 80 further includes a ring-shaped member 82 mounted circumferentially around the semicircular members 81. The outer surfaces of the semicircular members 81 serve as abutments 84 for the members 81 and 82. The semicircular members 81 fit into a groove 83 circumferentially formed in the casing 13 but have portions protruding radially from the groove 83. These portions and the ring-shaped member 82 are secured between the end face 37 of the stationary carrier 29 and the end face of the aforesaid other of the inner races 74.

Force exerted by the supporting member 20 on the inner race 74 abutting against the holder 80 has a component which is parallel with the axis of the output shaft 16. In order to cope with this component, much latitude should be allowed in deciding on the depth of the groove 83. The semicircular members 81 provided separately from the ring-shaped member 82 answer this purpose. The optimum depth of the groove 83 allows the ball bearing race assembly 14 to have a long life. Furthermore, the semicircular members 81 provided separately from the ring-shaped member 82 are simple in design and convenient for assembling. Since the holder 80 is secured between the aforesaid two end faces, it is impossible to allow the ring-shaped member 82 to be unintentionally uncoupled from the semicircular members 81 after the assembling thereof.

While the holder 80 has been described particularly in connection with a combination of the semicircular members 81 and the ring-shaped member 82, obviation of the necessity for the ring-shaped member 82 will be achieved by the provision of an annular recess in the end face 37 of the stationary carrier 29 so that the semicircular members 81 may be accommodated therein such that the end face 37 is made flush with a flank of each semicircular member 81 and allowed to abut against the aforesaid other of the inner races 74.

Figure 3:
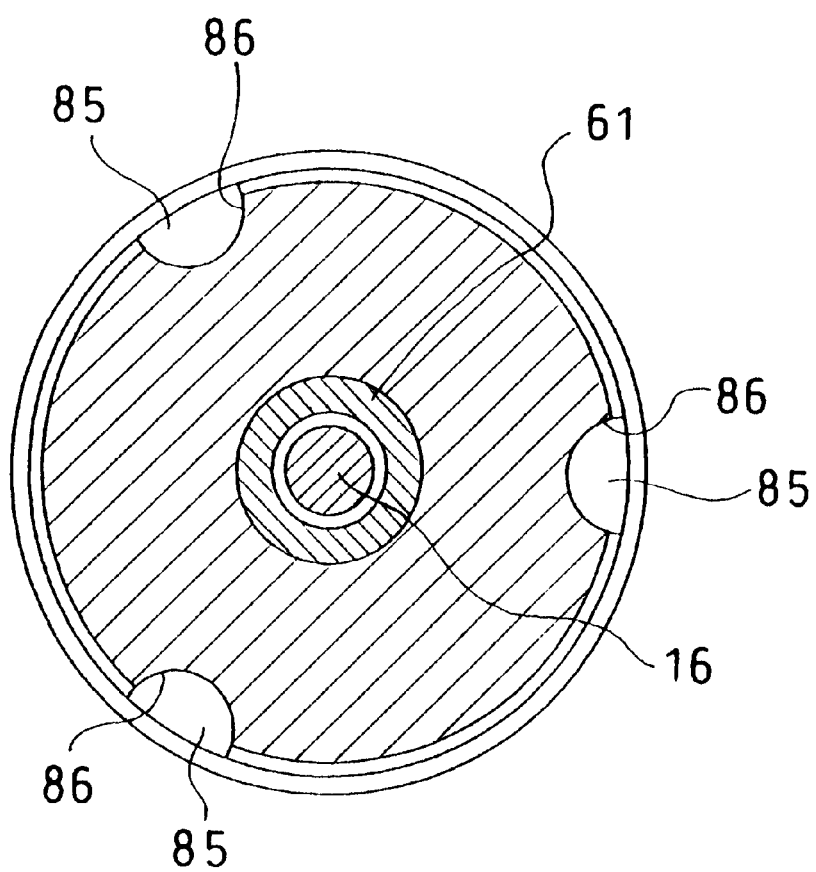
FIG. 3 is an enlarged vertical section thereof taken through a plane perpendicular to the axis of the casing of a hydraulic motor incorporated therein.

The groove 83 circumferentially formed in the casing 13 of the hydraulic motor 11 may be replaced by a plurality of longitudinally formed grooves 86 which are equally circumferentially spaced and each of which is of semicircular cross-section as shown in FIG. 3. In this case, each groove 86 is fitted with a member 85 which conforms to and is generally complementary to the inner semicylindrical surface of the groove 86 and has a portion slightly protruding from the groove 86 so as to mount the ring-shaped member 82 thereon or so as to be positioned in the aforesaid annular recess provided in the end face 37 of the stationary carrier 29.

As compared with the circumferentially formed groove 83, these alternative grooves 86 can be made deep enough to stabilize the holder 80 without detriment to the strength of the casing 13.

A cover 90, on which a bearing 94 is mounted, engages an opening through which access to the interior 91 of the casing 13 of the hydraulic motor 11 is obtained. The casing 13 is closed at its innermost end by a partition 93, on which a bearing 95 is mounted. The output shaft 16 is rotatably supported by the bearings 94 and 95 and splined to a cylinder block 96 having a plurality of pressure chambers, in each of which an axially movable piston 97 is slidably mounted.

Arranged in the vicinity of the partition 93 is a pivotable bearing plate 99 seated on a bearing 98. A cylinder 100 for pivoting the bearing plate 99 is provided at one end of the bearing plate 99. The ingress and egress of hydraulic fluid from the cylinder 100 is effected through a valve 101, a mechanism of which forms no part of the invention per se.

The end of each piston 97 is adapted to engage the bearing plate 99 seated at an oblique angle. When a pressure chamber having an opening disposed in the immediate vicinity of the bearing plate 99 is replenished with hydraulic oil, the piston 97 accommodated therein is shifted toward extend position. Consequently, the end of this piston 97 bears upon the bearing plate 99 and causes the output shaft 16 to rotate. The ingress and egress of hydraulic fluid from the cylinder block 96 is effected through a counterbalance valve 110 mounted on the cover 90.

Figure 4:
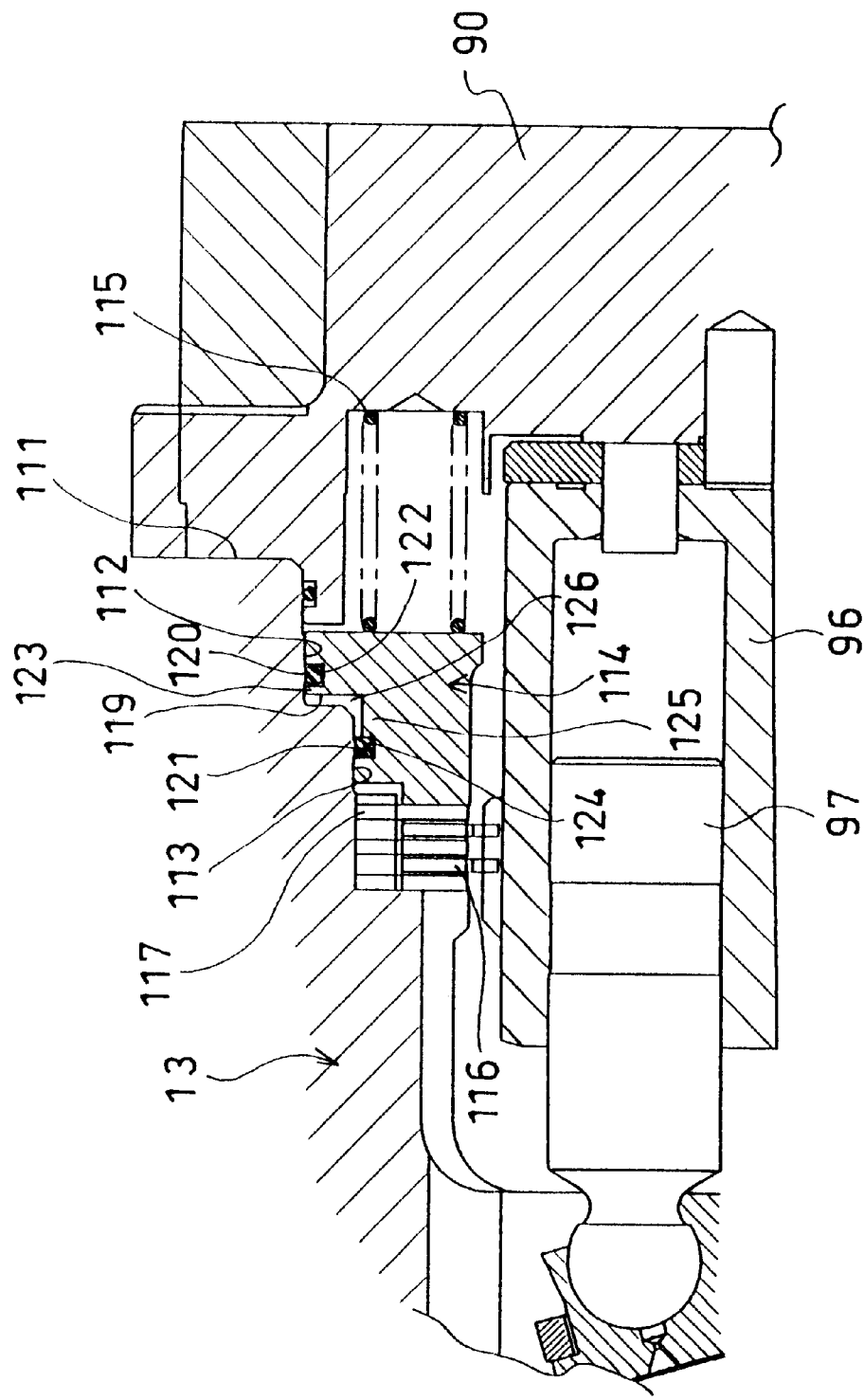
FIG. 4 is an enlarged fragmentary sectional elevation to help explain the structural construction of a braking device incorporated therein.

Referring now to FIG. 4, the casing 13 opens through an end face 111 and has an axially aligned bore 113 and counterbore 112 therein. An axially movable brake piston 114 is operable in the bore 113 and counterbore 112. A spring 115 engages at its opposite ends against the cover 90 and the brake piston 114 to bias the latter to the left in FIG. 4. Brake disks 117 splined to the inner cylindrical surface of the bore 113 alternate with brake disks 116 splined to the outer cylindrical surface of the cylinder block 96. The brake disks 116 and 117 are adapted to be releasably secured between the innermost end face of the bore 113 and the end of the brake piston 114 opposite the end against which the spring 115 engages.

Just before the cylinder block 96 is replenished with hydraulic oil through the counterbalance valve 110 (FIG. 1), a pressure chamber 119 formed in a transition section between the bore 113 and counterbore 112 is replenished with hydraulic oil. The egress of hydraulic oil from the pressure chamber 119 begins when the ingress of hydraulic oil into the cylinder block 96 has been interrupted. When the pressure chamber 119 is replenished with hydraulic oil, the brake piston 114 is moved away from the brake disks 116 and 117 against the force of the spring 115. When the hydraulic oil is displaced from the pressure chamber 119, the brake piston 114 is yieldingly biased by the spring 115 to a position where the cylinder block 96 is braked.

The brake piston 114 has a first portion which is of intermediate diameter and is adjacent one end adapted to engage the brake disk 117, a second portion which is of smaller diameter, and a third portion which is of larger diameter and is adjacent the other end abutting against the spring 115. The first and third portions are in sliding contact with the bore 113 and counterbore 112 respectively.

An annular groove 124 is provided in the first portion for receiving a seal 121. Another annular groove 122 is provided in the third portion for receiving another seal 120. The annular groove 122 is disposed in the immediate vicinity of a radial shoulder defined at the intersection of the second and third portions such that an extremely thin wall 123 is interposed between the annular groove 122 and the pressure chamber 119.

A space 126, which communicates with the pressure chamber 119, is defined between the inner cylindrical surface of the bore 113 and the second portion of the brake piston 114.

The provision of the space 126 serves to prevent the seal 121 from being damaged and permit it to be of small diameter and free the inner cylindrical surface of the bore 113 from flaws when the brake piston 114 is actuated. In order to ensure that the seal 121 is prevented from being damaged, the seal 121 should preferably be disposed in the immediate vicinity of the end of the brake piston 114 adapted to engage the brake disk 117. Since the seal 120 has only to provide sealing engagement with the inner cylindrical surface of the counterbore 112, the wall 123 may be as thin as possible so as to permit the brake piston 114 to require less dimension in the axial direction.

The second portion of the brake piston 114 serves to provide the brake piston 114 with a structure of light weight.

The seal 120 may take the form of a D-ring which is of D-shaped cross-section so as to prevent the brake piston 114 from rolling because of frictional resistance developed when it is actuated.

FIELD OF INDUSTRIAL UTILIZATION

The crawler drive unit of this invention is useful as a propelling mechanism for a construction machine. It requires less dimensions in the axial and radial directions and makes it possible to apply a large-capacity propelling mechanism to a compact construction machine.

What is claimed is:

1. A crawler drive unit comprising:
    a hydraulic motor having a casing and an output shaft coaxial therewith and rotatably supported therein;
    a speed reducer disposed at one end of said casing and having a sun gear adapted to be driven by said output shaft, an internal ring gear mounted circumferentially around said casing with a pair of ball bearing race assemblies interposed therebetween, a plurality of planetary gears meshing both with said sun gear and with said internal ring gear, and a carrier mechanism mounted on said one end of said casing and adapted to transmit a rotation of said planetary gears to said internal ring gear;
    said carrier mechanism including a stationary carrier mounted circumferentially around said one end of said casing and forming a splined connection therebetween;
    said stationary carrier including a first disk portion extending radially outwardly from an inner cylindrical surface splined to said one end of said casing;
    said first disk portion having a plurality of blind holes formed in a surface disposed on a side opposite a narrow end face abutting against a holder for fixedly holding one of said ball bearing race assemblies, said blind holes receiving journal portions of a plurality of carrier pins respectively carrying carrier gears by which said rotation of said planetary gears is transmitted to said internal ring gear, each of said blind holes terminating at a vertical surface against which an end face of each of said carrier pins is allowed to abut, said vertical surface being substantially coplanar with an end face of said casing disposed at said one end; and
    said stationary carrier further including a second disk portion extending radially inwardly from said first disk portion and having a surface disposed in opposite relationship to, and substantially coplanarly with, said end face of said casing disposed at said one end, said surface being provided with an annularly hollowed-out portion in such a position as to conform to said end face of said casing disposed at said one end.

2. A crawler drive unit according to claim 1, further comprising:
    a supporting member rotatably supported by said bearing assemblies secured between said supporting member and said casing, said supporting member having an inner portion and a first end;
    wherein said speed reducer is disposed at said first end of said supporting member;
    wherein a rim is connected with said first end of said supporting member by bolts, said internal ring formed on an inner cylindrical surface of said rim so as to overlay and mesh with said plurality of planetary gears, an end cover held by means of a plurality of other bolts at one end of said rim;
    wherein a thickness of said supporting member and said rim at the connecting point are substantially equal;
    wherein said supporting member has an annular concave portion on said inner portion, said annular concave portion becomes gradually narrow from a speed reducer side towards a hydraulic motor side and is overlapped with the portion supported by said bearing assemblies.

3. The crawler drive unit as defined in claim 2, wherein a radically inward facing face of an inner rib constituting said annular concave portion, is positioned slightly over a reaction line of said bearing assemblies towards said speed reducer.

4. The crawler drive unit as defined in claim 3, wherein said end cover includes a cylindrical extension formed into a cylindrical socket for receiving said one end of said rim;
    wherein said supporting member also includes a cylindrical extension formed into a cylindrical socket for receiving the other end of said rim;
    wherein a thickness of said rim at said first end connected to said supporting member is substantially the same thickness as the sum of the height of teeth of said internal ring gear and the thickness of said rim at an intermediate portion of said rim having said teeth;
    wherein an annular groove is interposed between said teeth and said connected portion of said rim.

5. A crawler drive unit according to claim 1, further comprising:

a supporting member rotatably supported by said bearing assemblies secured between said supporting member and said casing;

wherein said speed reducer is disposed at a first end of said supporting member;

wherein said internal ring gear is supported at said first end of said supporting member so as to overlay and mesh with said plurality of planetary gears;

wherein said casing includes a first portion which has a smaller diameter and carries inner races of said bearing assemblies, a second portion which has a larger diameter and is disposed away from said speed reducer with respect to said first portion, a radial shoulder defined at an intersection of the first and second portions and a groove circumferentially formed next to said splined portion around said casing;

wherein said bearing assemblies are arranged in an axial direction, one of said inner races of said bearing assemblies abutting against said radial shoulder and the other of said inner races abutting against said holder;

wherein said holder consists of a first holder fitting into said groove and a ring-shaped member mounted circumferentially around said first holder which is positioned between said carrier and the other of said inner races of said bearing assemblies, said first holder comprising two semicircular members.

6. A crawler drive unit comprising:

a hydraulic motor having a casing and an output shaft coaxial therewith and rotatably supported therein;

a speed reducer disposed at one end of said casing and having a first sun gear adapted to be driven by said output shaft, an internal ring gear mounted circumferentially around said casing with a pair of ball bearing race assemblies interposed therebetween, a plurality of planetary gears meshing both with said first sun gear and with said internal ring gear, and a carrier mechanism mounted on said one end of said casing and adapted to transmit a rotation of said planetary gears to said internal ring gear;

a shaft carrying said first sun gear and connected to said output shaft of said hydraulic motor;

a second sun gear disposed coaxially with said shaft carrying said first sun gear in spaced relation thereto;

a rotating carrier accommodating said first sun gear and having a plurality of pins for receiving rotatably thereon said planetary gears, said rotating carrier having a portion in which a splined connection is formed between said rotating carrier and said second sun gear, said rotating carrier further having an opening on a side opposite a side on which said splined connection is formed, said opening being formed with a seat in an inner cylindrical surface such that a thrust plate which is substantially as thick as an axial depth of said seat is positioned therein; and said carrier mechanism including a stationary carrier mounted circumferentially around said one end of said casing and carrying a plurality of carrier gears meshing both with said second sun gear and with said internal ring gear;

wherein said thrust plate is provided with a detent fitting into a keeper socket provided in the inner cylindrical surface of said seat; and wherein at least a portion of said thrust plate, against which one end of said shaft is to be allowed to abut, is hardened.

7. A crawler drive unit as defined in claim 6, wherein:

said shaft and said output shaft of said hydraulic motor have cylindrical surfaces formed with splines adapted to mesh with mating splines formed in the inner cylindrical surface of a sleeve overlaying both said shaft and said output shaft of said hydraulic motor; and said sleeve has a major portion received in a bore provided in said second sun gear such that said second sun gear overlies said sleeve in spaced relation thereto.

8. A crawler drive unit comprising a hydraulic motor having an output shaft;

a hollow casing rotatably supporting said output shaft therein;

a speed reducer disposed at a first end of said casing, said speed reducer including a speed reducer shaft connected to said output shaft of said hydraulic motor, a first sun gear fixed at a first end of said speed reducer shaft, a plurality of planetary gears mounted circumferentially around said first sun gear and meshing with said first sun gear, an internal ring gear rotatably supported at said first end of said casing so as to overlay and mesh with said plurality of planetary gears, a rotating carrier disposed rotatably around said first sun gear so as to overlay said first sun gear for receiving rotatably said plurality of planetary gears thereon, said rotating carrier having an opening on said first end side of said speed reducer shaft, a second sun gear disposed coaxially with said speed reducer shaft in spaced relation thereto and connected to said rotating carrier at one side of said rotating carrier, a stationary carrier fixed circumferentially around said first end of said casing so as to overlay said second sun gear, and a plurality of carrier gears respectively rotatably carried by said stationary carrier for transmitting said rotation of said planetary gears to said internal ring gear;

wherein said opening of said rotating carrier is formed with a seat in an inner cylindrical surface, and includes a thrust plate positioned on said seat, a thickness of said thrust plate being substantially as thick as an axial depth of said seat, said thrust plate configured to contact with said first end of said speed reducer shaft;

wherein said thrust plate is provided with a detent configured to fit into a keeper socket provided in the inner cylindrical surface of said seat; and wherein at least a portion of said thrust plate, against which said first end of said shaft is to contact, is hardened.

9. A crawler drive unit as defined in claim 8, wherein said speed reducer shaft and said output shaft of said hydraulic motor have cylindrical surfaces formed with splines, adapted to mesh with mating splines formed in an inner cylindrical surface of a sleeve overlaying both said speed reducer shaft and said output shaft of said hydraulic motor;

wherein said sleeve has a major portion received in a bore provided in said second sun gear such that said second sun gear overlies said sleeve in spaced relation thereto.

10. A crawler drive unit as defined in claim 8, wherein said speed reducer shaft and said output shaft of said hydraulic motor have cylindrical surfaces formed with splines adapted to mesh with mating splines formed in the inner cylindrical surface of a sleeve overlaying both said speed reducer shaft and said output shaft of said hydraulic motor; and said sleeve having a major portion received in a bore provided in said second sun gear such that said second sun gear overlies said sleeve in spaced relation thereto;

wherein a connection portion of said rotating carrier and said second sun gear is overlaid with said stationary carrier.

11. A crawler drive unit comprising:

a hydraulic motor having an output shaft;

a hollow casing rotatably supporting said output shaft therein;

a supporting member rotatably supported by bearing assemblies secured between said supporting member and said casing, said supporting member having a first end; and a speed reducer disposed at said first end of said supporting member, said speed reducer including a first sun gear driven by said output shaft, a plurality of planetary gears mounted circumferentially around said first sun gear and meshing with said first sun gear, an internal ring gear supported at said first end of said supporting member so as to overlay and mesh with said plurality of planetary gears, a carrier splined circumferentially around a first end of said casing configured to transmit a rotation of said planetary gears to said internal gear;

wherein said casing of said hydraulic motor has a first portion which has a smaller diameter and carries inner races of said bearing assemblies, a second portion which has a larger diameter and is disposed away from said speed reducer with respect to said first portion, a radial shoulder defined at an intersection of the first and second portions and a plurality of recesses circumferentially formed next to said spline portion around said casing, said recesses having semicircular cross-sections respectively;

wherein said bearing assemblies are arranged in an axial direction, one of said inner races of said bearing assemblies abuts against said radial shoulder and the other of said inner races abuts against a holder;

wherein said holder comprises a plurality of first holders fitting into said recesses and a ring-shaped member mounted circumferentially around said first holders and is positioned between said carrier and the other of inner races of said bearing assemblies.

* * * * *